Figure 1:
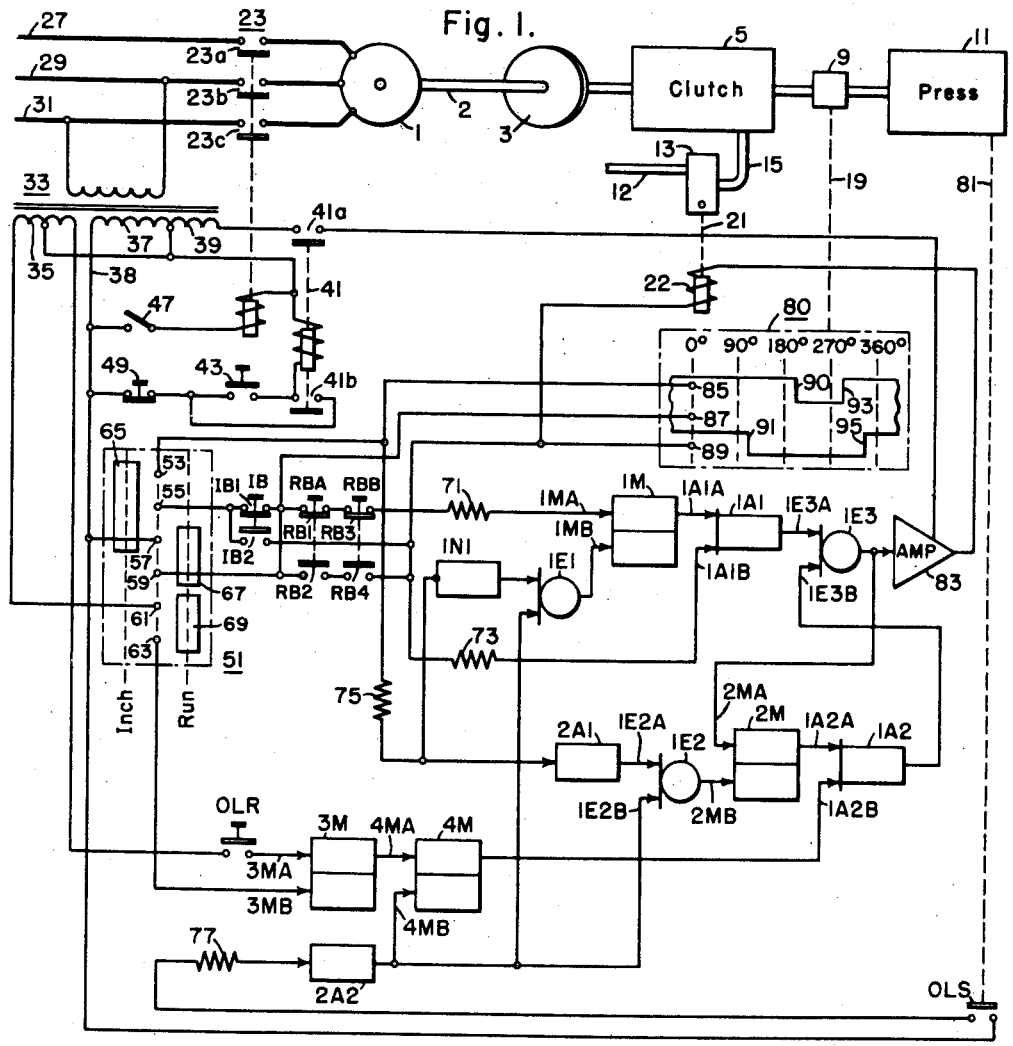

May 26, 1959 — R. E. GIBONEY ET AL — 2,888,576
CONTROL APPARATUS FOR A MACHINE DEVICE
Filed May 29, 1956

WITNESSES
Robert C. Baird
Leon J. Laza

INVENTORS
Ray E. Giboney &
George E. King.
BY John B. Davidson
ATTORNEY

United States Patent Office 2,888,576
Patented May 26, 1959

2,888,576
CONTROL APPARATUS FOR A MACHINE DEVICE

Ray E. Giboney, Amherst, and George E. King, Eggertsville, N.Y., assignors to Westinghouse Electric Corporation, East Pittsburgh, Pa., a corporation of Pennsylvania Application May 29, 1956, Serial No. 588,079

6 Claims. (Cl. 307—81)

This invention relates to machine tool control circuits and more particularly to circuits for controlling the operation of a cyclically operating machine responsive to the energization and deenergization of electromagnetic means.

Machine tools of the nature of the punch press have been controlled for some years by a compressed air actuated clutch coupling the press to a relatively constant speed prime mover such as an induction motor. The compressed air that actuates the clutch is controlled by an electromagnetically actuated valve so that the control equipment energizing the electromagnet need have only a relatively low power output. Systems of this general nature are described in the copending application of R. P. Bonn et al., Serial No. 408,924, filed February 8, 1954, now Patent No. 2,802,154, for Punch Press Control. Requirements of the control system for the electromagnet are that the electromagnet should not be energized unless all of a predetermined number of control buttons are depressed by the human operator, that the press should complete its cycle after the actual punching has been completed, that one and only one cycle of operation be completed while the control buttons are continuously depressed, and that "on the hop" operation be provided to furnish the operator with means for safely increasing the productive capacity of the machine. It is further desirable that the components utilized in the control circuitry be of a nature that will require a minimum amount of repair or preventive maintenance so as to minimize the down time and subsequent loss of productive capacity of the machine. This requirement has become increasingly important in recent years in view of assembly line techniques whereby a number of machines will be shut down when the assembly line is deprived of the productive capacity of any one of the machines. Prior art control systems have required a multiplicity of relays and other devices having moving parts and arcing contacts that have proven to be sources of considerable maintenance problems.

Accordingly, it is one object of this invention to provide an improved control system for a cyclically operating machine tool.

Another object is to provide a machine tool control system that utilizes a minimum number of mechanical components having moving parts or make-and-break contact members.

Still another object is to provide a machine tool control system of extreme reliability so as to operate for long periods without the necessity for repair or preventive maintenance.

Still another object is to provide a simple, reliable anti-repeat control system for a punch press controlled by an electromagnetically actuated air clutch.

Figure 2:
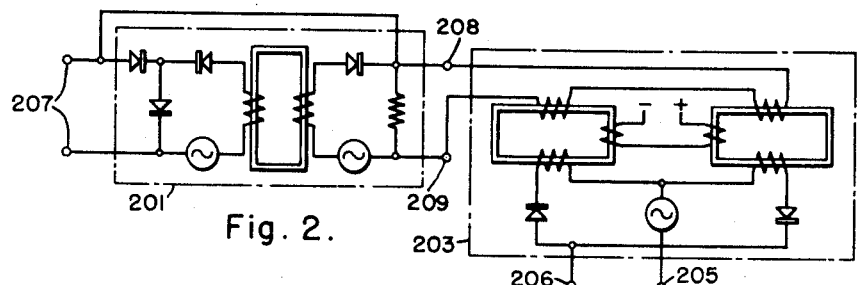

Other objects and features of this invention will become apparent upon consideration of the following description thereof when taken in connection with the accompanying drawings, wherein:

Figure 1 is a schematic diagram of a machine tool control system in accordance with the teachings of this invention; and Fig. 2 is a schematic diagram of a power amplifier such as is used in the control system of Fig. 1.

Before proceeding with the detailed description of the invention, it is well to define certain of the components that are utilized therein and to briefly describe their operation. The components to which reference is made are static devices that are referred to in the art as And, Or, Not and Memory or Flip-Flop circuits. An And circuit may be defined as a circuit that responds to a plurality of conditions and has an output dependent on such conditions. The relationship is such that the And element transfers from a first to a second output condition or state only if all of the conditions are present.

An Or circuit is a circuit that has on output dependent on a plurality of conditions. The relationship is such that the Or element has an output signal if any of the conditions are present. An Or circuit having plural inputs may be designed to supply an output only if energy is supplied to any of its input circuits.

A Not circuit is a circuit which has substantially zero output voltage or current when an input control signal is applied thereto and an output voltage or current when no input signal is applied thereto.

A Memory or Flip-Flop circuit is a bistable circuit that, in response to a first condition, produces an output that is maintained even though the first condition thereatfer is discontinued. The Memory element is reset and the output terminated in response to a second condition. Thus, the Memory circuit may produce an output voltage or current in response to a signal applied to a first control circuit thereof even through the signal is discontinued, and will discontinue the output signal only in response to a second signal applied to a second control circuit thereof.

Suitable And, Or, Not and Memory circuits for practicing this invention may be found in the AIEE Conference Paper No. CP56-91 by W. G. Evans, W. G. Hall and R. I. Van Nice entitled "Magnetic Logic Circuits for Industrial Control Systems." The logic circuits described therein make use of the so-called "Ramey Magnetic Amplifier," and have been found to be entirely satisfactory for the purposes of this invention. One characteristic of the Memory circuitry described therein is that an output signal of one phase will be produced in response to an "on-signal," and in response to an "off-signal" an output signal will be produced that is 180° in time phase relation out of phase with the signal produced in response to the on-signal. Since the other circuitry described can be designed to be responsive only to the output signal produced in response to the on-signal and not to signals 180° out of phase therewith, no particular problem has been encountered as a result of this characteristic.

A circuit that has been found to be particularly useful with the control circuitry of the present invention is the amplifier depicted in Fig. 2. This amplifier provides a full-wave output signal in response to a half-wave input or control signal so that the full power capabilities of the amplifier are realized. This amplifier comprises a conventional full-wave, self-saturating doubler type magnetic amplifier 203 such as is described in U.S. Patent No. 2,743,405 of G. E. King et al. having output terminals 205, 206 and control terminals 208, 209. Coupled to the input terminals 208 and 209 are both the input terminals 207 and output terminals of a Ramey type magnetic amplifier 201 such as described in the aforementioned AIEE Conference Paper. The Ramey magnetic amplifier has the characteristic of providing an output signal one half cycle after the application of an input signal thereto. Assuming that control signals are applied to terminal 208 from an external control source that are in phase with the alternating current applied to the Ramey amplifier on the reset half cycle thereof, resetting of the magnetic core of the Ramey amplifier will be blocked when the external signal is applied so that the Ramey amplifier will deliver an output signal on the next half cycle thereof. This output signal will be ineffective insofar as the input circuit of the Ramey amplifier is concerned but will serve to control the doubler self-saturating amplifier 203. In effect, a full-wave rectified input signal is applied to magnetic amplifier 203 so that a full-wave output signal will be derived therefrom.

With reference now to the control circuitry of Fig. 1, there is shown in block schematic form a punch press 11 which is coupled to a prime mover such as three-phase synchronous motor 1, through a flywheel 3, an electromagnetically actuated air clutch 5 and a gearing member 9. High pressure air is applied to conduit 12 and is gated to conduit 15 for actuation of clutch 5 by means of valve 13. The core of electromagnet 22 is mechanically coupled by connection 21 to valve 13 so as to control the operation of the valve.

The synchronous motor 1 is energized from three-phase buses 27, 29 and 31 upon closure of relay contacts 23a, 23b and 23c of relay 23. Closure of start push button 43 energizes the coil of main starting relay 41 through normally closed stop push button 49 and closes contact 41a to energize amplifier 83 and also closes contact 41b to seal in the relay. Closure of switch 47 will actuate relay 23 to close contacts 23a, 23b and 23c for energization of motor 1.

A selector switch 51 is provided for the purpose of selecting the mode of operation of the punch press. When it is desired to operate the press in the "inch" mode, contact bar 65 bridges contact terminals 53, 55 and 57. When it is desired to operate in the "run" mode contact bar 67 bridges contact terminals 57 and 59 and contact bar 69 bridges contact terminals 61 and 63. For the purpose of controlling the operation of the circuitry in conjunction with the various push buttons described below, there is provided a limit switch 80 driven from the gearing member 9 that determines the effectiveness of the push buttons at various points in the cycle of operation of the press. This limit switch has contact terminals 85, 87 and 89 which are bridged at various times in the cycle of the limit switch, as shown in the diagram. The limit switch may be of the rotating drum type and for purposes of illustration is represented in flat form. The punching operation is effected at the 180° position of the press.

In order to facilitate the explanation of the operation of the control system and the operating cycle thereof, assume, first, that the selector switch 51 has been set in the run position. Run push buttons RBA and RBB, respectively, have normally closed contacts RB1 and RB3 which are serially connected, and contacts RB2 and RB4 which are normally open and, when closed, are serially connected. When the push buttons are in their normal position, the contacts RB1 and RB3 complete a circuit from power bus 38 through bridging member 67 and dropping resistor 71 to a control circuit 1MA of Memory circuit 1M which is effective to provide a continuing "on" output signal from the Memory circuit after either or both contacts RB1 and RB3 are open. The function of dropping resistor 71 and other dropping resistors hereinafter mentioned is only to drop the voltage across the secondary winding 37 of transformer 33 to a value suitable for energization of the input circuit of the logic circuit associated therewith. It is to be noted that the input control circuits of the various logic circuit components are represented by arrows. Reference is made to the aforementioned AIEE Conference Paper for a description of the control circuits. The output signal for Memory circuit 1M is applied to a first input circuit 1A1A of And circuit 1A1. Since there is no signal applied to the other input circuit 1A1B of And circuit 1A1, which may be regarded as the main control or gating circuit of the And circuit, no output signal will appear. Upon closure of contacts RB2 and RB4 when the push buttons RBA and RBB are depressed by the human operator, a circuit will be completed from bus 38 through bridging member 67, contacts RB2 and RB4 and dropping resistor 73 to the aforesaid input circuit 1A1B of And circuit 1A1. The output signal from And circuit 1A1 resulting thereby is applied to input circuit 1E3A of Or circuit 1E3 so that an input signal is applied to amplifier 83. The output signal from the amplifier will be effective to energize the control coil 22 of the electromagnet that actuates air clutch 5 so that the press is started through its operating cycle.

After the limit switch 80 has been driven through about 100° of revolution, contacts 87 and 89 will be bridged, thereby shorting the contacts RB2 and RB4 so that they are thereafter ineffective to control operation of the press while so bridged. Prior to that time, however, if either or both of the buttons are released, the press will stop. After about 100° of revolution when contacts 87 and 89 are bridged by the drum segment between the projections 91 and 95, removal of control from the human operator will not endanger him since it will be impossible for him to get his hands into the press before the punching operation is completed.

Bridging the contact members 85 and 87 completes a circuit from bus 38 through bar 67, contacts 87 and 85, resistor 75 to the input of Not circuit 1N1. The output circuit of Not circuit 1N1 is coupled to an input circuit of Or circuit 1E1, the output of which is coupled to a second control circuit 1MB of Memory circuit 1M. The function of input circuit 1MB is to cut off the continuing output signal from Memory circuit 1M. Since there is no ouput signal from Not circuit 1N1, the second control circuit 1MB will not be energized by the Not circuit until contacts 85 and 87 are no longer bridged. This event will occur shortly after the punch operation has been completed, as at about 190° of revolution of limit switch 80.

The output signal from Or circuit 1E3 is applied to a first input circuit 2MA of Memory circuit 2M. The output signal from Memory circuit 2M is applied to an input circuit 1A2A of And circuit 1A2. When both of the input circuits 1A2A and 1A2B are energized, a signal will be applied to the other input circuit 1E3B of Or circuit 1E3. Thus, if there is no signal applied to the second control circuit 2MB of Memory circuit 2M, the output signal from 1E3 in addition to energizing amplifier 83 will also energize the on-circuit 2MA of Memory circuit 2M which, in turn, will be effective to energize an input circuit of 1E3 to drive the amplifier 83 after Memory circuit 1M has been cut off. When contact 85 is disconnected from contact 87 after limit switch 80 has rotated through 200° where contact 85 is within the opening in the drum between the projections 90 and 93, Not circuit 1N1 will produce an output signal which will be effective to cut off the output signal from Memory circuit 1M. Prior to this, phase reversing circuit 2A1 will be energized to in turn energize off control circuit 2MB of Memory circuit 2M through Or circuit 1E2. When contact 85 is disconnected from contact 87, the off signal control circuit 2MB of Memory circuit 2M will be deenergized. However, subsequent to the deenergization of input circuit 2MB, there will be applied to 2MA at least a one-half cycle output signal from Or circuit 1E3 due to the inherent time delays of And circuit 1A1 and Or circuit 1E3. Since each of the Not, And and Memory circuits has an inherent one half cycle time delay, it will be seen that the combination of Not circuit 1N1, Memory circuit 1M, and And circuit 1A1 will produce a one and one-half cycle time delay. However, And circuit 2A1 will have only a one-half cycle time delay so that control circuit 2MB will be deenergized before the output signal from Or circuit 1E3 derived from Memory circuit 1M finally disappears. Thereafter, Memory circuit 2M will be effective to energize amplifier 83 provided control circuit 1A2B of And circuit 1A2 is energized. The circuitry for energizing circuit 1A2B will be described below, it being here assumed that control circuit 1A2B is continuously energized.

When the limit switch has rotated through about 280° and contact 85 is again connected to the drum segment beginning with the projection 93, contact 85 will again be connected to contact 87. However, as long as run push buttons RBA and RBB are depressed, no output signal will appear from Memory circuit 1M. Should the operator desire to insert new material in the press "on the hop," he may release push buttons RBA and RBB to so insert the material and the machine will not stop operating. Contact 85 may be again connected to contact 87 at any point in the operating cycle of the press after the punching operation has been completed, the 280° position of the limit switch being selected only for purposes of illustration.

At about 350° of rotation of the limit switch the contact 89 leaves the drum segment between the projections 91 and 95, and contact 87 is disconnected from contact 89. This serves to remove the short circuit from across the contacts RB2 and RB4 so that the press will be stopped if the operator has not been successful in completing an "on the hop" operation. It will be noted that the press will be stopped if the push buttons RB2 and RB4 have been continuously closed since the punching operation has been completed or if the push button have been released and not again depressed. Operation of the press will continue only after the push buttons have been released after the punching operation in order to reenergize control circuit 1MA and again depress to energize control circuit 1A1B. The purpose of this is to prevent repeat operation of the press until the material to be punched has been removed so as to prevent possible damage to the work material.

The function of And circuit 1A2 is to provide a safety device responsive to overload of the press. Circuit 1A2B is energized from a Memory circuit 4M, the on-signal control circuit 4MA of which is in turn energized from the output circuit of Memory circuit 3M. The on-signal control circuit 3MA of Memory circuit 3M is energized from secondary winding 35 of transformer 33 through overload reset push button OLR. The off-signal control circuit 3EB of Memory circuit 3M is energized from secondary winding 35 through contact bar 69 of selector switch 51. Pressing push button OLR will provide an output signal from 3M after the selector switch has been pressed in the neutral position. This will energize Or signal control circuit 4MA to provide an energizing signal for control circuit 1A2B of And circuit 1A2.

Overload switch 81 has contact member OLS which completes a circuit to energize the off-signal control circuit 4MB of Memory circuit 4M through dropping resistor 77 and phase reversal circuit 2A2. It should be noted that the phase reversal circuits 2A1 and 2A2 are nothing more than half-wave Ramey amplifiers such as described in the aforementioned AIEE Conference Paper. The output signal from phase reversing circuit 2A2 is also effective to energize the off-signal control circuit 1MB of Memory circuit 1M through Or circuit 1E1 and to energize off-signal control circuit 2MB of Memory circuit 2M through the input circuit 1E2B of Or circuit 1E2. Overload switch 81 may be actuated by deflection of the press when the punching operation required is excessive or by other convenient means well known in the art.

For the inch mode of operation, the selector switch is set so that shorting bar 65 connects together contacts 53, 55 and 57. It will be noted that in effect phase reversing circuit 2A1, Or input circuit 1E2A and off-signal Memory input circuit 2MB are energized at all times so that there will be no output signal from Memory circuit 2M that will energize And circuit input 1A2A so as to produce an output from And circuit 1A2.

Inch push button IB has two contacts, normally open contact IB2 are normally closed contact IB1. Contact IB1 is effective to energize on-signal Memory input 1MA through run push button contacts RB1 and RB3. Initially then there will be an output from 1M that will energize an input circuit 1A1A. Depressing inch push button IB will close contacts IB2 to energize And input circuit 1A1B, Or input circuit 1E3A and the input circuit of amplifier 83 so as to produce an output circuit from the amplifier 83 that will energize electromagnet coil 22 and actuate clutch 5. The press is under the control of the inch push button at all times. Contacts 85 and 87 effectively short circuit push button contacts IB1 until the limit switch 80 has completed about 190 to 200° of revolution, i. e., until after the punching operation has been completed. Additionally, the input circuit of Not circuit 1N1 is energized so that Memory circuit 1M produces a continuous output since its off-signal control circuit 1MB is not energized. The press is, therefore, under the control of the inch push button at all times and the limit switch 80 is ineffective to control the operation of the press.

With the exception of the push buttons and electromagnetically actuated valve 13, it will be noted that the above-described control circuit contains no cyclically operating moving parts. Only the push buttons and the limit switch for moving parts are susceptible to damage as a result of arcing and these components are easily repaired if such should become necessary. The rest of the cyclically operating components are static devices and are inherently long lived. The anti-repeat feature of the system has been found to be practically foolproof. Compared to the control systems utilizing mechanical relays and contactor members, the circuit of the present invention has a virtually indefinite lifetime practically free of repair and periodic maintenance problems.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In control apparatus for a machine device having an operating cycle controlled by electromagnetic means, the combination of first and second limit switch means coupled to said machine device and actuated thereby, said first limit switch means being open during a first predetermined portion of the operating cycle of said machine device, said second limit switch means being closed during a second predetermined portion, including said first portion, of said operating cycle; first and second bistable means, with each of said bistable means having a first input and a second input and being operable to supply a continuing output signal responsive to energization of said first input and to terminate said output signal responsive to energization of said second input; first And circuit means for coupling the output signal of said first bistable means to said electromagnetic means to energize said electromagnetic means responsive to a first control signal applied to said first And circuit means; push button means having first normally closed contacts for energizing said first input of said first bistable means, and having second normally open contacts for applying said first control signal to said first And circuit means; first control means coupling said output signal from said second bistable means to said electromagnetic means, with the first input of said second bistable means being responsive to the output signal of said first bistable means to supply an output signal to energize said electromagnetic means; said first limit switch means being coupled to said second input of said second bistable means and operative to energize said second input of said second bistable means during said operating cycle other than during said first predetermined portion thereof; second control means including said second limit switch means for energizing said second input of said first bistable means over said first predetermined portion of said operating cycle; and with said second limit switch means being connected to short circuit said push button means over said second predetermined portion of said operating cycle.

2. In control apparatus for a machine device having an operating cycle controlled by electromagnetic means, said apparatus comprising: first and second limit switch means coupled to said machine device and actuated thereby, said first limit switch means being open during a first predetermined portion of the operating cycle of said machine device, said second limit switch means being closed during a second predetermined portion, including said first portion, of said operating cycle, first, second and third bistable means, with each of said bistable means having a first input and a second input and being operative to supply an output signal responsive to energization of said first input, and to cut off said output signal responsive to energization of said second input; first And circuit means for coupling said output signal of said first bistable means to said electromagnetic means to energize said electromagnetic means responsive to a first control signal applied to said first And circuit means; push button means having first normally closed contacts for energizing said first input of said first bistable means and having second normally open contacts for applying said first control signal to said first And circuit; second And circuit means responsive to the output signal from said third bistable means for coupling said output signal from said second bistable means to said electromagnetic means, with said second bistable means being responsive to the output signal of the said first bistable means to energize said electromagnetic means; said first limit switch means being coupled to said second input of said second bistable means to energize said second input of said second bistable means during said operating cycle other than during said first predetermined portion thereof; first control means including said second limit switch means for energizing said second input of said first bistable means during said first predetermined portion of said operating cycle; with said second limit switch means being connected to short circuit said push button means during said second predetermined portion of said operating cycle, manually actuable means for energizing said first input of said third bistable means, and second control means responsive to a predetermined overload condition of said machine device for energizing said second input of each of said second and third bistable means.

3. In control apparatus for a machine device having an operating cycle and controlled by electromagnetic means, said apparatus comprising: first and second limit switch means coupled to said machine device and actuated thereby, said first limit switch means being open during a first predetermined portion of the operating cycle of said machine device, said second limit switch means being closed during a second predetermined portion, including said first portion, of said operating cycle, first and second bistable means, with each of said bistable means having a first input and a second input and being operable to supply a continuing output signal responsive to energization of said first input and to cut off said output signal responsive to energization of said second input; first And circuit means for coupling said output signal of said first bistable means to said electromagnetic means to energize said electromagnetic means responsive to a first control signal being applied to said first And circuit means; first push button means having first normally closed contacts for energizing said first input of said first bistable means and having second normally open contacts for applying said first control signal to said first And circuit; second push button means having third normally-closed contacts in series with said first contacts for energizing said first input of said first bistable means and having fourth normally open contacts for applying said first control signal to said first And circuit; first control means coupling said output signal from said second bistable means to said electromagnetic means, with said second bistable means being responsive to the output signal of said first bistable means to energize said electromagnetic means; said first limit switch means being coupled to said second input of said second bistable means to energize said second input of said second bistable means during said operating cycle other than during said first predetermined portion thereof; second control means including said second limit switch means for energizing said second input of said first bistable means during said first predetermined portion of said operating cycle; said second limit switch means being connected to short ciruit said push button means during said second predetermined portion of said operating cycle, and third control means including said selector switch means and said first and second limit switches connected to short circuit said second limit switch during said second portion, other than during said first portion, of said operating cycle.

4. In control apparatus for a machine device having an operating cycle and being controlled by electro-magnetic means, said apparatus comprising: first and second limit switch means coupled to said machine device and actuated thereby, with said first limit switch means being open during a first predetermined portion of the operating cycle of said press, said second limit switch means being closed during a second predetermined portion including said first portion, of said operating cycle, first and second bistable means, with each of said bistable means having a first input and a second input and being operable to supply a continuing output signal responsive to energization of said first input and to cut off said output signal responsive to energization of said second input; first And circuit means for coupling said output signal of said first bistable means to said electromagnetic means to energize said electromagnetic means responsive to a first control signal being applied to said first And circuit means; first push button means having first normally closed contacts for energizing said first input of said first bistable means and having second normally open contacts for applying said first control signal to said first And circuit; second push button means having third manually-closed contacts in series with said first contacts for energizing said first input of said first bistable means and having fourth normally open contacts for applying said first control signal to said first And circuit; first control means coupling said output signal from said second bistable means to said electromagnetic means, said second bistable means being responsive to the output signal of said first bistable means to energize said electromagnetic means; said first limit switch means being coupled to said second input of said second bistable means to energize said second input of said second bistable means during said operating cycle other than during said first predetermined portion thereof; second control means including said second limit switch means for energizing said second input of said first bistable means during said first predetermined portion of said operating cycle; said second limit switch means being connected to short circuit said push button means during said second predetermined portion of said operating cycle, and selector switch means selectively connecting said limit switch means to one of a first control circuit including the contacts of said second push button means and said first contacts of said first push button means and a second control circuit including the second contacts of said first push button means.

5. In control apparatus for a machine device having an operating cycle and being controlled by electro-magnetic means, said apparatus comprising: first and second limit switch means coupled to said machine device and actuated thereby, said first limit switch means being open during a first predetermined portion of the operating cycle of said machine device, said second limit switch means being closed during a second predetermined portion, including said first portion, of said operating cycle, first, second and third bistable means each having a first control circuit and a second control circuit and an output circuit and being operative in response to energization of said first control circuit to supply an output signal until energization of said second control circuit thereof; first And circuit means coupling said output circuit of said first bistable means responsive to energization of a control circuit of said first And means; first Or circuit means; second And circuit means for coupling said second bistable means to said first Or circuit means responsive to said output signal from said third bistable means; said first Or circuit means being responsive to an output signal from said first And circuit means to energize said electromagnetic means; said first control circuit of said second bistable means being coupled to said first Or circuit so as to be energized therefrom; push button means having first normally closed contacts connected for energizing said first input circuit of said first bistable means and having second normally open contacts connected for applying a first control signal to said first And circuit; said first limit switch means being coupled to said second control circuit of said second bistable means to energize said second control circuit of said second bistable means during said operating cycle other than during said first predetermined portion thereof; first control means including said second limit switch means for energizing said second control circuit of said first bistable means during said first predetermined portion of said operating cycle; said second limit switch means being connected to short circuit said push button means during said second predetermined portion of said operating cycle, manually actuable means for energizing said first control circuit of said first third bistable means, and second control means responsive to a predetermined overload condition of said machine device for energizing said second control circuits of said first, second and third bistable means.

6. In machine device control apparatus for a machine device having an operating cycle and being controlled by electromagnetic means, the combination of a first Or circuit means having an output circuit coupled to said electromagnetic means for energization thereof and having a plurality of input control circuits, first bistable means operative to supply a first output signal in an output circuit of said first bistable means in response to energization of a first control circuit thereof and adapted to terminate said first output signal in response to energization of a second control circuit thereof; first And circuit means operatively connected between said output circuit of said first bistable means and one of said input control circuits of said Or circuit means responsive to energization of an input control circuit of said first And circuit means; second bistable means operatively connected to be responsive to an output signal of said Or circuit means for supplying a second output signal to energize another input control circuit of said Or circuit means when a first control circuit of said second bistable means is energized and adapted to terminate said second output signal when a second control circuit of said second bistable means is energized; manually operable switch means for selectively energizing one of said first control circuit of said first bistable means and said control circuit of said And circuit means; limit switch means for energizing said second control circuit of said second bistable means for a first predetermined portion of said cycle and for energizing said second control circuit of said first bistable means for a second predetermined portion of said cycle.

References Cited in the file of this patent

UNITED STATES PATENTS

| | | |
|---|---|---|
| 2,361,212 | King | Oct. 24, 1944 |
| 2,575,717 | King | Nov. 20, 1951 |